(12) United States Patent
Gatherer

(10) Patent No.: US 6,636,560 B1
(45) Date of Patent: Oct. 21, 2003

(54) INCREASED BIT RATE OF TELEPHONY MODEMS USING CONTROLLED INTERSYMBOL INTERFACE

(75) Inventor: Alan Gatherer, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/234,570

(22) Filed: Jan. 20, 1999

Related U.S. Application Data

(60) Provisional application No. 60/071,994, filed on Jan. 20, 1998.

(51) Int. Cl.[7] .............................................. H04L 5/16
(52) U.S. Cl. ....................... 375/222; 375/219; 375/233; 375/290
(58) Field of Search ................................. 375/222, 219, 375/286, 290, 291, 233; 379/90.01

(56) References Cited

U.S. PATENT DOCUMENTS

| | | | |
|---|---|---|---|
| 3,388,330 A | * 6/1968 | Kretzmer | 375/290 |
| 4,558,454 A | * 12/1985 | Hills et al. | 375/290 |
| 4,720,839 A | * 1/1988 | Feher et al. | 375/291 |
| 5,528,625 A | * 6/1996 | Ayanoglu et al. | 375/222 |
| 5,801,695 A | 9/1998 | Townshend | 375/340 |
| 5,809,075 A | 9/1998 | Townshend | 375/254 |
| 5,835,538 A | 11/1998 | Townshend | 375/295 |
| 6,052,412 A | * 4/2000 | Ruether et al. | 375/231 |

OTHER PUBLICATIONS

Wu et al., Class–IV PRS above the Nyquist rate, IEE Proceedings, vol. 135, No. 2, pp. 183–191, Apr. 1988.*
Internet white paper of 3Com U.S. Robotics on x2™ technology (http://x2.usr.com / technology / whitepapers.html).
Internet white paper of Rockwell Semiconductor Systems on K56flex ™ technology (http: / / www.nb.rockwell.com / K56flex / whitepapers / k56whitepaper.html).
"Contrasting Performance of Faster Binary Signaling with QAM", AT&T Bell Laboratories Technical Journal, vol. 63, No. 8, Oct. 1984, pp. 1419–1445, (Foschini, G.J.).

* cited by examiner

*Primary Examiner*—Shuwang Liu
(74) *Attorney, Agent, or Firm*—Tammy L. Williams; W. James Brady, III; Frederick J. Telecky, Jr.

(57) ABSTRACT

The operation of a line card in the local exchange of a point-to-point switched telephone network is modified to increase the data rate of voiceband modem transmission by increasing the sampling rate and providing controlled intersymbol interference using partial response techniques.

3 Claims, 2 Drawing Sheets

INCREASED BIT RATE OF TELEPHONY MODEMS USING CONTROLLED INTERSYMBOL INTERFACE

This application claims priority under 35 U.S.C. § 119 (e)(1) of provisional application Ser. No. 60/071,994, filed Jan. 20, 1998.

FIELD OF THE INVENTION

This invention relates generally to data communications over public switched telephone networks (PSTN) 10 (refer to FIG. 3 for an exemplary system useful for implementing the present invention) and similarly operated private branch exchanges (PBX) and other like networks; and, in particular, to the high speed transmission of digital data using the voiceband frequencies over such networks.

BACKGROUND OF THE INVENTION

Transmissions over the public switched telephone network (PSTN) 10 using voiceband frequencies are described in Townshend U.S. Pat. Nos. 5,801,695; 5,809,075; and 5,835,538 relating to "High Speed Communications System for Analog Subscriber Connections," and Internet white papers of 3Com U.S. Robotics on x2™ technology (http://x2.usr.com /technology/whitepapers.html) and of Rockwell Semiconductor Systems on K56flex™ technology (http://www.nb.rockwell.com/K56flex/whitepapers/k56whitepaper.html), the entireties of which (including entireties of all references cited therein) are incorporated herein by reference.

The feature that distinguishes x2™ and K56flex™ modem technologies from xDSL (digital subscriber line) technologies is its use of the line card 12 presently used in the local exchange 14 for digitization of voice as a data symbol generator. In this manner, a digital modem effectively sits in the local exchange 14 without any new equipment being placed in the exchange and with the local telco (telephone company) being unaware of the use of its line card 12 as a symbol generator. An important aspect of this idea is that the transmitter physically resides in the service provider's building and that only the final conversion to symbols is done by the line card 12. If there is a lot of redundancy in the symbols, bandwidth will be wasted on the trunk. For instance, if the modulation requires an 8-bit symbol to transmit 6 bits of data then for every 8 bits transmitted over the digital telephony trunk there will be two "wasted" bits that do not contribute to the data rate of the modem. In the x2 technology, data rates of 56kbps are claimed for the standard digital telephone call rate of 7 bits (one bit often being lost to telco signaling) at 8 kHz. There is therefore no redundancy in the bits sent from the remote transmitter in the service provider 16, over the telco trunk digital network, to the line card 12. Therefore, without changing the line card 12, we cannot increase the "arithmetic" capacity above 56 kbps. By arithmetic capacity we mean the capacity obtained by counting the number of bits per second used to generate the signal put onto the wire by the line card 12. The Shannon capacity of the wire is probably much higher, but to get closer to this capacity we require to transmit a signal onto the wire with more degrees of freedom than 56 kbps.

SUMMARY OF THE INVENTION

In order to increase the capacity further, we modify the line card 12 in the local exchange 14 to increase the arithmetic capacity of the system in a manner that minimizes the increase in cost of the line card 12. We propose increasing the sampling rate of the card 12 as a method for increasing the data rate of the modem. This method comes at a minimal cost as TI (Texas Instruments') chipsets in the line cards 12 presently in use are capable of higher sampling rates and the data rate can be increased over band limited channels by using partial response techniques to send data symbols above the Nyquist limit.

DETAILED DESCRIPTION OF PREFERRED EMBODIMENTS

One way of increasing the capacity of the channel is to increase the number of bits in the line card 12 DAC (digital-to-analog converter). It is often assumed that there is no point in increasing the 8 kHz sampling rate because the voiceband channel bandwidth is less than 4 kHz. However, this restriction is only true for intersymbol interference-free transmission. It is possible to transmit using controlled interference using what is commonly called partial response signaling. As the line cards 12 presently in use are capable of higher sampling rates (but not higher resolutions), this is a minimal cost solution to higher data rates than 56 kbps.

Figure 1:
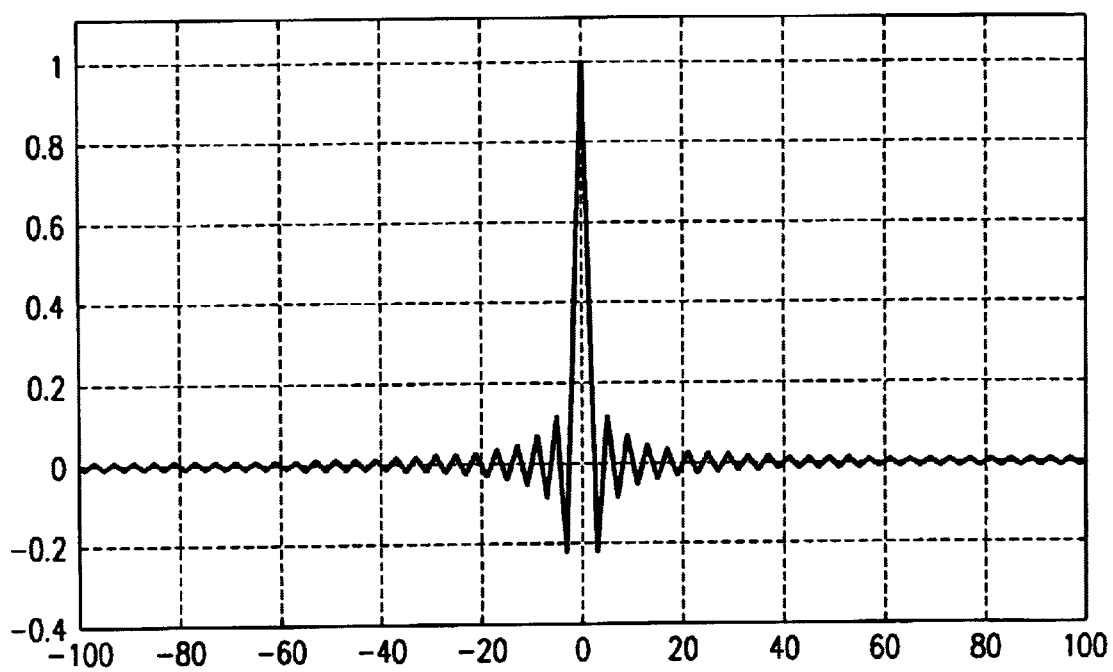
FIG. 1 is a plot of a standard sinc pulse.
Figure 2:
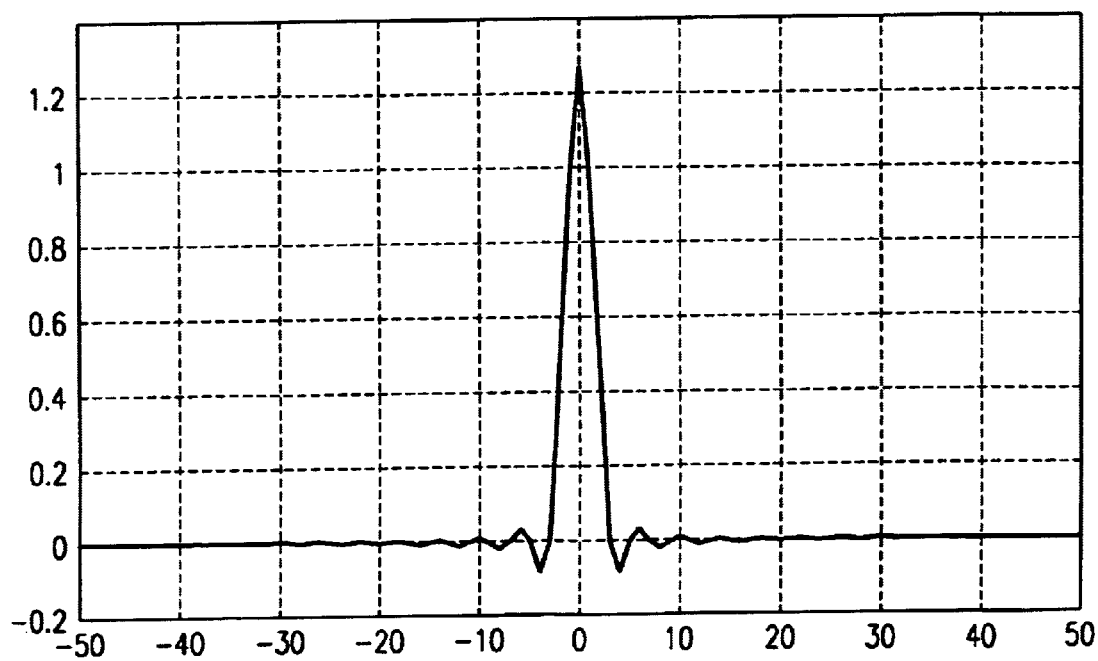
FIG. 2 is a plot of the sum of two shifted sincs in accordance with the invention.
Figure 3:
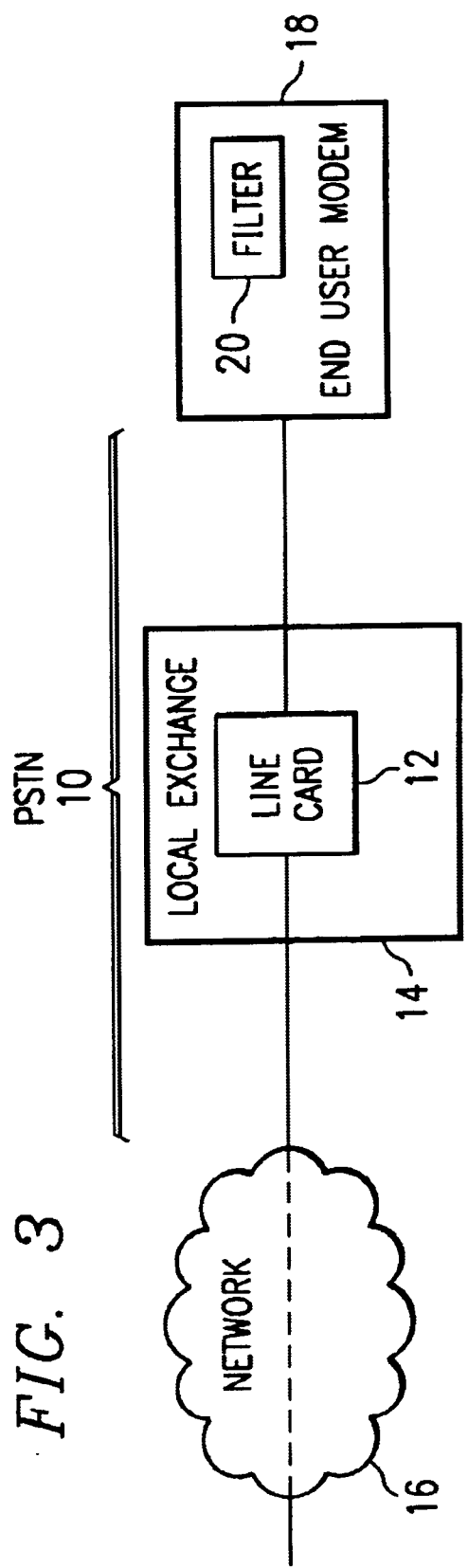
FIG. 3 is a simplified block diagram of a system for implementing an embodiment of the present invention.

For example, if for each symbol $A_k$ we transmit, the symbol $A_{k-1}+1.2732A_k+A_{k+1}$ is received, then the received signal has significantly more levels compared to the transmitted signal but that is okay because only the number of transmit levels is constrained in the line card 12; the user modem 18 can sample with a much higher resolution. The advantage of receiving a signal with controlled ISI (intersymbol interference) can be seen as follows. In FIG. 1, a standard sinc pulse is plotted. For a given bandwidth, a sinc pulse gives the maximum symbol rate for no intersymbol interference. In FIG. 1, the pulse is sampled at twice the zero ISI symbol rate so that the ISI caused by sending data at twice the usual rate can be seen. The power in the ISI (all coefficients of the pulse except the center coefficient) in this case is equal to the power in the center coefficient of the pulse and is spread over many coefficients on either side of the center pulse. It would be difficult to get a good signal-to-interference ratio from such a pulse. The pulse shape in FIG. 2 generates the controlled ISI $A_{k-1}+1.2732A_k+A_{k+1}$ as described above and is the sum of two shifted sinc pulses. If the three central coefficients are thought of as the effect of the main pulse, then the residual ISI is about a tenth of the power in the three central coefficients. This is a 9 dB improvement over the sinc pulse and requires only a three tap feedback filter 20 in the receiver 18 to implement. Compared to FIG. 1, most of the residual ISI energy in FIG. 2 is closer to the central pulse and therefore easier to cancel. Therefore, using new pulses such as the one above with controlled ISI allows the sampling rate to be doubled without incurring a 0 dB ISI penalty. Even if the central three coefficients of the filter are considered to carry the signal in the sinc pulse, there is still a 6 dB gain to be had by using the pulse in FIG. 2. The amount of controlled ISI required will depend on the required SNR and the complexity of the receiver.

What is claimed is:

1. A method of transmitting data using voiceband frequencies over point-to-point switched telephone networks, comprising:

transmitting data symbols in digital form to a line card of a local exchange switch;

performing digital-to-analog conversion from the digital data to data in analog form in the line card;

sending the analog data from the line card to an end user modem;

wherein the data symbols are sent from the line card to the end user modem at a rate above the Nyquist limit and are received at the end user modem with controlled intersymbol interference; and wherein for each symbol $A_k$ transmitted, the symbol $A_{k-1}+1.2732A_k+A_{k+1}$ is received by the end user modem.

2. The method of claim 1, wherein the controlled intersymbol interference is processed using a three tap feedback filter in the end user modem.

3. A method of transmitting data using voiceband frequencies over point-to-point switched telephone networks, comprising:

transmitting data symbols in digital form to a line card of a local exchange switch;

performing digital-to-analog conversion from the digital data to data in analog form in the line card;

sending the analog data from the line card to an end user modem;

wherein the data symbols are sent from the line card to the end user modem at a rate above the Nyquist limit and are received at the end user modem with controlled intersymbol interference; and wherein the controlled intersymbol interference is the sum of two shifted sinc pulses.

* * * * *